United States Patent
Klein et al.

(10) Patent No.: US 8,575,582 B2
(45) Date of Patent: Nov. 5, 2013

(54) METHOD FOR THE OPTICAL MONITORING OF A MONITORED ZONE AND LIGHT SENSOR

(75) Inventors: Michael Klein, Waldkirch (DE); Christoph Märkle, Freiburg (DE)

(73) Assignee: Sick AG, Waldkirch/Breisgau (DE)

(*) Notice: Subject to any disclaimer, the term of this patent is extended or adjusted under 35 U.S.C. 154(b) by 295 days.

(21) Appl. No.: 13/245,112

(22) Filed: Sep. 26, 2011

(65) Prior Publication Data

US 2012/0126152 A1 May 24, 2012

(30) Foreign Application Priority Data

Sep. 27, 2010 (EP) .................................... 10010900

(51) Int. Cl.
*H01J 40/14* (2006.01)

(52) U.S. Cl.
USPC .............. 250/578.1; 250/222.1; 250/559.29

(58) Field of Classification Search
USPC ........... 250/221, 559.4, 559.3, 559.29, 221.1, 250/216
See application file for complete search history.

(56) References Cited

U.S. PATENT DOCUMENTS

| | | | |
|---|---|---|---|
| 4,814,810 A | | 3/1989 | Ishiguro |
| 5,225,689 A | * | 7/1993 | Buckle et al. ............... 250/559.4 |
| RE34,749 E | * | 10/1994 | Leong et al. ............... 250/237 G |
| 5,613,167 A | | 3/1997 | Suzuki |
| 5,754,281 A | | 5/1998 | Maeda |
| 6,130,437 A | * | 10/2000 | Cerny et al. ................. 250/559.4 |
| 6,437,312 B1 | * | 8/2002 | Adler et al. .................... 250/216 |
| 6,498,333 B1 | | 12/2002 | Christensen |
| 8,242,476 B2 | * | 8/2012 | Mimeault et al. ........ 250/559.29 |
| 8,436,748 B2 | * | 5/2013 | Mimeault et al. ............. 340/917 |

FOREIGN PATENT DOCUMENTS

| | | |
|---|---|---|
| DE | 36 27 972 A1 | 2/1988 |
| DE | 37 29 334 A1 | 3/1989 |
| EP | 0 491 118 A2 | 6/1992 |
| EP | 0 685 748 A1 | 12/1995 |
| EP | 2 163 917 A1 | 3/2010 |

OTHER PUBLICATIONS

European Search Report, EP 10 01 0900, mailed on Feb. 21, 2011.

* cited by examiner

*Primary Examiner* — Tony Ko
(74) *Attorney, Agent, or Firm* — Nath, Goldberg & Meyer; Jerald L. Meyer; Stanley N. Protigal

(57) ABSTRACT

In a method and a light sensor for the optical monitoring of a monitored zone, light is transmitted into the monitored zone and light reflected back or remitted back from the monitored zone is detected by first and second light receivers, each having two spatial detection zones for the scanned zone and the background zone of the monitored zone. A first output signal of the first light receiver is produced depending on whether the center of the light reflected back/remitted back is located in the first or in the second detection zone of the first light receiver, with the first output signal only being able to adopt one of two possible states. In a similar way, a second output signal of the second light receiver is produced. The first and the second output signals are logically linked to one another to produce an object determination signal.

15 Claims, 1 Drawing Sheet

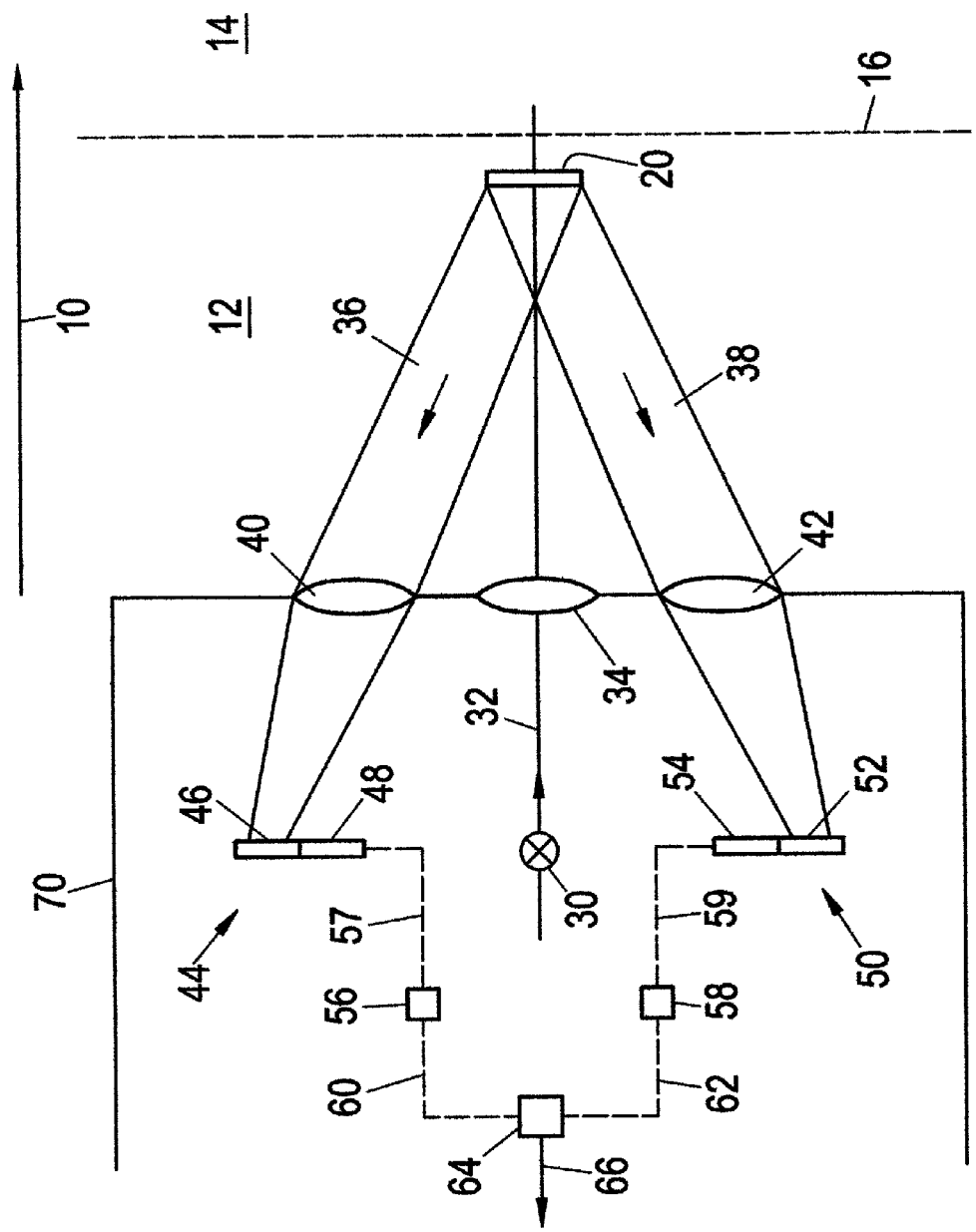

METHOD FOR THE OPTICAL MONITORING OF A MONITORED ZONE AND LIGHT SENSOR

The invention relates to a method for the optical monitoring of a monitored zone, wherein light is transmitted into the monitored zone and light reflected back or remitted back from the monitored zone is detected by a first light receiver and by a second light receiver which each have two spatial detection zones for the scanned zone and the background zone of the monitored zone. The invention further relates to a light sensor for carrying out such a method.

Light sensors are used to detect objects which are located in a monitored zone. In this process, light is sent through a transmission optics into the monitored zone. The light is reflected back or remitted back from an object which may be present in the monitored zone and is received by a light receiver which can e.g. be located adjacent to the transmitter and spaced apart therefrom. On its path to the light receiver, the light reflected back or remitted back passes through a reception optics which limits it spatially. Depending on whether the object is nearer to or further away from the transmission/reception arrangement, the light reflected back and/or remitted back is incident at a different point on the light receiver in accordance with the triangulation principle. If spatial information on the incident light can be measured by the light receiver, a conclusion can be drawn on whether the object is located nearer to or further away from the transmission/reception arrangement. The light receiver can thus e.g. have two detection zones onto one of which light is incident when the object is located in a far zone and light is incident onto the other detection hone when the object is located in a near zone. The two detection zones can e.g. respectively be formed by one or more devices of a photodiode array.

The difference of the photocurrents which the two detection zones deliver can e.g. serve as the output signal of a light receiver. If the light reflected back/remitted back is completely incident onto a detection zone, its photocurrent is at a maximum and the photocurrent of the other detection zone is equal to zero. It can be concluded from the sign of the photocurrent difference whether the detected object is located in the foreground or in the background of the monitored area.

On the other hand, position sensitive devices (PSDs) are used which deliver a different current signal depending on the point of incidence of the light spot.

The light spot which is incident onto the light receiver has a specific extent as a rule. It is ensured by the evaluation method that the light spot is associated with that detection zone in which the center of the light spot is located.

Using such a detection method, a recognition is possible of whether a diffusely reflective object and/or a homogenous object is located in the near zone of the monitored space.

High-contrast objects reflect or remit the light to a different extent at different surface regions. This effect results in a displacement of the radiation center of the light reflected back/remitted back. This displacement can falsify the positional information measured at the light receiver. Known methods propose as a solution that two reception devices of the same type having corresponding reception optics are arranged symmetrically to the transmission device. The resulting measured signals of the light receiver devices are added. Since the center displacement by a high-contrast object results in a displacement of the light center in the same spatial direction at both receiver devices, the displacement of the light center on the one light reception device caused by the contrast effects a displacement of the center in the direction of the detection zone for the near zone and at the other receiver device a displacement of the light center into the detection zone for the far zone. The amount of displacement is the same, however, so that an addition of the photocurrents of the two light receivers results in a compensation of the effect caused by the contrast of the object.

Such arrangements having two position sensitive reception devices at opposite sides of the transmission device, with the measured currents of the position sensitive devices being added, are known e.g. from U.S. Pat. No. 5,613,167, U.S. Pat. No. 5,754,281 or U.S. Pat. No. 4,814,810.

DE 37 29 334 describes an arrangement in which the measured signals of the two detection zones which correspond to the scanned zone of the monitored zone are added, whereas the detection zones for the background zone are formed by a common photodiode device. In this known method, on the one hand, the signals of the respective first detection zones are accordingly electronically combined and, on the other hand, the signals of the respective second detection zones are combined in that they are formed by a common second detection zone.

It is the object of the present invention to provide an improved method of monitoring a monitored zone and an improved light sensor with which an even more robust detection of objects is possible which depends even less on the surface properties of the object to be detected, and which in particular allow a robust detection of objects having reflective or multiply reflective surfaces.

This object is satisfied by a method of monitoring a monitored zone having the features of claim 1 and by a light sensor having the features of claim 12. Dependent claims are directed to preferred embodiments and aspects.

In accordance with the invention, a first output signal of the first light receiver is produced in dependence on whether the center of the light reflected back/remitted back is located in the first detection zone or in the second detection zone of the first light receiver. The output signal is designed in this respect so that it can only adopt one of two possible states. In the same way, a second output signal of the second light receiver is produced which is located on the other side of the transmission light path. Each of the light receivers therefore delivers an output signal which can only adopt two states. Only for reasons of simplicity, these two states of the output signals will also be termed "positive" and "negative" or "ON" and "OFF" in the following.

The two output signals are logically linked to one another to produce an object determination signal. A positive object determination signal in this respect represents a signal which allows the presence of an object in the scanned zone to be concluded. A negative object determination signal indicates that no object is in the scanned zone.

The two light receivers are therefore first evaluated completely separately and only then are the output signals used together. In contrast to the known solutions, no addition of the photodiode currents of the individual light receivers is therefore carried out before the signal evaluation here. Whereas a displacement of the two light centers on both receivers which is identical in amount is required in the known solutions to compensate the effect of a high-contrast object or of an object which is otherwise critical on the center position of the light reflected back/remitted back, such an identity in amount—which is not present with directed remission (or reflection) at reflective surfaces—is not necessary in the method in accordance with the invention.

Depending on the demand of the application, the logical connective to be used can be selected so that the objects to be expected can be reliable detected.

In the following, objects will be called critical if they e.g. are of high contrast, if they have reflective surfaces or if their surfaces are not planar and have shiny areas in part. Objects are classified as non-critical which have homogenous, diffusely reflective or remitting surfaces.

A background is likewise classified as critical if it is e.g. very rough and has shiny areas in part or is of high contrast. A background is e.g. classified as non-critical if it is essentially homogenous and reflects diffusely. It can in this respect e.g. be a uniform conveyor belt on which the objects are transported through the scanned zone of the monitored zone.

The method is e.g. advantageously suitable to realize a system having background masking. In this case, a respective positive output signal is produced by the individual light receivers when light reflected back/remitted back is incident onto the first detection zone of the associated light receiver which corresponds to a scanned zone of the monitored zone. A negative output signal of the respective light receiver is produced when the light reflected back/remitted back is incident onto the second detection zone of the associated light receiver which corresponds to the background zone. A respective positive output signal is therefore produced when a real object is located in front of the background; a respective negative signal when no real object is located in front of the background.

If. e.g. optical objects are to be detected in front of a substantially non-critical background, that is a homogenous background, an OR connective is advantageously selected as the logical connective, with a positive object determination signal being produced when at least one output signal is positive and a negative object determination signal being produced when both output signals are negative.

If no object is located in front of the non-critical background, both light receivers will deliver negative output signals since the non-critical background is correctly recognized independently by both light receivers. If a critical object is located in front of the background in the scanned zone, the two reception devices will possibly be differently influenced thereby. If the surface property of the object is such that both light receivers nevertheless deliver a positive output signal, it is correctly indicated that an object is located in the scanned zone. It is, however, ensured by the selected logical connective that a critical object is also detected as present in front of a non-critical background when only one light receiver delivers a positive output signal.

Different application demands can be taken into account by correspondingly selected logical connective s. In a manner still to be described, the use of an AND connective as a logical connective of the output signals of the light receivers is e.g. advantageous in which a positive object determination signal should be produced when both output signals are positive and a negative object determination signal is produced when at least one output signal is negative when an object which is non-critical in its surface property should be detected in front of a critical background.

If an object critical in its surface property should be detected in front of a background to be classified as critical, a logical connective in the manner of a FLIP-FLOP connective is advantageous in which a positive object determination signal is produced as soon as both output signals are positive at one time and a negative object determination signal is produced as soon as both output signals are negative at one time.

Examples for the effects of the named aspects will be explained in detail further below in the description of the Figures.

The method in accordance with the invention can also be used if a different detection mode is to be provided. It is thus e.g. possible that the light receivers are selected so that a respective positive output signal is produced when the center of the light reflected back/remitted back is incident onto the second detection zone of the associated light receiver which corresponds to the background zone. A negative output signal is respectively produced when the center of light reflected back/remitted back is incident onto the first detection zone of the associated light receiver which corresponds to the scanned zone. Each of the light receivers on its own therefore produces a positive signal when the background is visible and a negative signal when a diffusely reflective and homogenous object is located in front of the background.

Such a detection mode is additionally advantageous when critical objects may be present which have such a high reflective portion that the remaining residual emission or the remaining diffuse reflection would not be reliably sufficient for a reliable measurement in accordance with the triangulation principle.

If in such a detection mode a critical object is to be detected in front of a non-critical background, an OR connective is advantageously selected as the logical connective, with a positive object determination signal being produced when at least one of the output signals is negative and a negative object determination signal is produced when both output signals are positive. If no object is located in front of the non-critical background in the scanned zone, the two light receivers will correctly produce positive output signals so that a negative object determination signal arises overall. If, however, one of the output signals is negative, a positive object determination signal is produced because a critical object is obviously in front of the background.

Connectives of the AND type or FLIP-FLOP type can also be advantageous in such a detection mode. Such application scenarios will be explained with reference to an example further below within the framework of the descriptions of the Figures.

The scanned zone and the background zone can be fixed in advance, for example in a teach-in process (that is in a configuration process). For this purpose, for example, the dividing line between the scanned zone and the background zone is set electronically (for example by setting the detection zones). A diffusely reflective object or an object which remits back can in this respect be brought into the spacing of the desired dividing line between the scanned zone and the background zone and the detection zones of the first light receiver and the detection zones of the second light receiver are set such that the light reflected back/remitted back via the reception light paths by the object in the spacing of the desired dividing line is incident onto the respective border between the first and second detection zones.

A light sensor in accordance with the invention has a first evaluation device for forming the first output signal from the measured signal of the first light receiver. The evaluation device therefore forms the first output signal which can only adopt two possible states from the measured signal of the light receiver, that is e.g. of the photocurrent. In the same way, a second evaluation device forms the second output signal from the measured signal of the second light receiver.

It is generally also possible that a plurality of light receiver pairs are used which are arranged on different sides of the transmission device and are evaluated pairwise in the described manner.

The light sensor in accordance with the invention additionally has a logic unit which links the first output signal and the second output signal to one another in the described manner, for example, to produce an object determination signal. The object determination signal can then e.g. be output to give information to a user or to produce a warning signal or a stop signal.

The first evaluation device and the second evaluation device can be combined in a common evaluation device which is e.g. formed by a corresponding processor. The logic unit can likewise be integrated in such a common evaluation unit.

The reception light paths can be fixed, for example, by diaphragms or lenses which spatially restrict the light reflected back/remitted back. They can be made as separate devices or can be arranged as a common device, for example as a ring-shaped device, about the transmission light system axis. Two reception optics for the spatial fixing of the reception light paths are advantageously present symmetrically at oppositely disposed sides of the transmission light path.

The advantages of a light sensor in accordance with the invention, advantageous embodiments and their advantages result from the above description of the advantages of the method in accordance with the invention and its advantageous aspects.

The method in accordance with the invention will be explained in detail in the following with reference to the enclosed schematic FIGURE.

FIG. 1 shows a schematic representation of an embodiment of a light sensor in accordance with the invention.

A light sensor for monitoring a monitored zone 10 is shown in a schematic representation. In the embodiment shown, the monitored zone 10 comprises a scanned zone 12 and a background zone 14 which are separated by an imaginary dividing line 16. A check should be made whether an object is located in the foreground zone or whether it is free. The foreground zone therefore corresponds to the scanned zone here.

An object 20 to be detected is located in the scanned zone 12. In this respect, it can e.g. be an object 20 which is transported on a conveyor belt which runs along the imaginary dividing line 16. In such a case, the background zone 14 is not examined at all since the background is formed by the conveyor belt. Other applications are e.g. such that the scanned zone is formed by a rack bay, with it having to be determined whether an object is stored therein or not The background zone is then e.g. formed by the rear wall of the rack bay or by an adjoining rack bay, by a rack frame or similar. It is also only of interest for such an application whether there is a real object in the scanned zone, that is in the rack bay being looked at here.

The embodiment shown has a transmission device 30, e.g. a light emitting diode, which shines through a transmission optics 34, e.g. through a lens, into the monitored zone. The imaginary line 32 which passes through the transmission device 30 and the transmission optics 34 is called a transmission light system axis in the following, with the transmission light system including the totality of transmission device 30 and transmission optics 34. The transmission light is incident onto the object 20 and is reflected back or remitted back from it. That light reflected back or remitted back which is incident through the reception optics 40, 42 also shown as lenses here is designed by 36, 38. The reception light 36, 38 is incident onto the position sensitive photo devices 44, 50. The device 44 has a first detection zone 46 and a second detection zone 48, whereas the device 50 has a first detection zone 52 and a second detection sensor 54. If the light reflected back or remitted back originates from an object 20 in the scanned zone 12 of the monitored zone 10, the light is in each case incident onto the first detection zone 46, 52 when the object is sufficiently homogeneous and diffusely reflective. If, in a manner not shown here, the object were located in the background zone 14 or if the light were, without being disturbed by an object, to be incident e.g. onto a conveyor belt which is located at the imaginary dividing line 16, the reception light 36, 38 would be incident onto the respective second detection zone 48, 54.

The position sensitive devices 44, 50 deliver photocurrents, which are dependent on the point at which the light is incident, as measured signals 57, 59. The measured signals 57, 59 are delivered to evaluation devices 56, 58 which produce output signals 60, 62, which each only produce two states ("ON" or "OFF") from the photocurrent signals 57, 59. A complete evaluation is therefore carried out by the associated evaluation unit 56, 58 for every single photosensitive device 44, 50, said complete evaluation resulting in an output signal 60, 62 for every single photosensitive device 44, 50 which is either "ON" or "OFF". These output signals 60, 62, which are binary in this respect, are sent to a logic unit 64 which links them logically to one another. The logic unit 64 generates an object determination signal 66 from the logical connective of the output signals 60, 62.

The components of the light sensor can be combined in a housing 70.

The operation of a light sensor in accordance with the invention and of the method in accordance with the invention will be explained in detail with reference to the following examples.

An example will be looked at in which objects 20 are transported on a conveyor belt which moves along the imaginary dividing line 16. A critical object is in this respect e.g. an object which is packed in a shiny manner, has a rough surface with partly mirror-reflective regions or which has high contrasts. A non-critical object has a diffusely reflective and homogenous surface.

A non-critical background is formed e.g. by a homogenous and diffusely reflective conveyor belt. If the conveyor belt, however, e.g. has partly metallic regions or regions with high contrast differences, it is a critical background.

A light sensor in accordance with the invention can e.g. be used to produce an objection determination signal 66 which indicates whether an object 20 is located in the scanned zone, that is whether an object is located on the conveyor belt 16. If the conveyor belt moves, such an object determination signal can e.g. be used to count objects which are transported part the light sensor on the conveyor belt. Other applications provide that a signal is output which indicates the absence of an object 20 in the scanned zone 12.

A state is shown in FIG. 1 in which the object 20 in the scanned zone 12 is not critical. The respective received light 36, 38 is in each case incident onto the first detection zone 46, 52. If, however, the object 20 were to have a critical surface, the center of the received light can be displaced. This displacement takes place in the same direction at both position sensitive devices 44, that is e.g. downwardly in the FIGURE. In such a case, the center of the light at the upper position sensitive device 44 in FIG. 1 would possibly be displaced into the second detection zone 48, whereas it remains in the same detection zone 52 in the position sensitive device 50. If the object 20 e.g. has at least partly mirror reflective regions and if it is not arranged symmetrically, the one position sensitive device will possibly have more light reflected back incident on it than the other. The same applies e.g. to objects 20 with an inhomogeneous surface or irregularly arranged shiny regions.

In such a case, the evaluation from only one position sensitive receiver device or a direction addition of the measured signals 59, 59 would result in a falsified result due to the effect on the two devices 44, 50 being of different amounts.

In accordance with the invention, however, the measured signals 57, 59 are first converted into binary signals 60, 62 by corresponding evaluation devices 56, 58. The evaluation devices can, for example, include comparators for this purpose. Every single position sensitive device 44, 50 is therefore initially completely evaluated. The output signals 60, 62 are linked in a logical unit 64 to produce the final object determination signal 66. The logical link can in this respect e.g. take place as follows.

First, a first detection mode ("background masking") is considered in which the evaluation units 56, 58 should produce output signals 60, 62 "ON" when received light 36, 38 is incident onto the respective first detection zones 46, 52. In the event of a non-critical object 20, every single position sensitive device 44, 50 would therefore produce an output signal 60, 62 "ON" when the object 20 is in the scanned zone 12. With critical objects or with a critical background, this information of a single position sensitive receiver device or a direction addition of the measured signals would not be reliable for the reasons described. Which connective is suitable for different application scenarios and which object determination signal 66 results therefrom will be set forth in the following.

Application Scenario Critical Object/Non-Critical Background
 Connective: OR
 Object determination signal 66 positive when at least one output signal 60, 62 is at "ON".
 Object determination signal 66 negative when both output signal 60, 62 are at "OFF". In this case, the position sensitive devices 44, 50 "see" the critical background, that is e.g. the conveyor belt, in the imaginary dividing line 16.

Application Scenario Critical Background/Non-Critical Object
 Connective: AND
 Object determination signal 66 positive when both output signals 60, 62 are at "ON". In this case of this application scenario, both position sensitive devices 44, 50 "see" the non-critical object.
 Object determination signal 66 negative when at least one output signal 60, 62 is at "OFF".

Application Scenario: Object Critical/Background Critical:
 Connective: In the manner of a FLIP-FLOP
 Object determination signal 66 positive when both output signals 60, 62 are at "ON" at one time.
 Object determination signal 66 negative when both output signal 60, 62 are at "OFF" at one time.

In a second detection mode, the evaluation devices 56, 58 should produce output signals 60, 62 "ON" when no object 20 is located in the scanned zone, that is the background zone or a conveyor belt in the dividing line 16, is freely visible. If, however, an object to be classified as non-critical is located in front of the imaginary dividing line in the scanned zone 12, the position sensitive devices 44, 50 or the associated evaluation devices 56, 58 should output output signals 60, 62 "OFF" (in the sense "scanned zone not free"). If therefore there is no object 20 in the foreground region 12, both position sensitive devices 44, 50 per se deliver output signals "ON" with a non-critical background. If a non-critical object 20 enters into the scanned zone 12, both position sensitive devices 44, 50 produce a signal "OFF".

In a similar manner as for the above case of background masking, a high-contrast object 20, an object with at least partially shiny regions or with an inhomogeneous surface or a correspondingly critical background may result in a falsification of the signal if the measured signals 57, 59, that is e.g. the photocurrents of the position sensitive device 44, 50, were directly added or only the measured signal of a position sensitive device were evaluated.

In the following, a respective advantageous connective and the resulting object determination signals are set forth for this second detection mode, again for different application scenarios.

Application Scenario Critical Object/Non-Critical Background:
 Connective: OR
 Object determination signal positive when at least one output signal 60, 62 is at "OFF".
 Object determination signal negative when both output signals 60, 62 are at "ON". In this case of this application scenario, both position sensitive devices 44, 50 "see" the non-critical background.

Application Scenario Critical Background/Non-Critical Object
 Connective: AND
 Object determination signal positive when both output signals 60, 62 are at "OFF". In this case of this application scenario, both position sensitive devices 44, 50 "see" the non-critical object.
 Object determination signal negative when at least one of the output signals 60, 62 are at "ON".

Application Scenario: Object Critical/Background Critical:
 Connective: In the manner of a FLIP-FLOP
 Object determination signal positive as soon as both output signals 60, 62 are at "OFF" at one time.
 Object determination signal negative as soon as both output signals 60, 63 are at "ON" at one time.

In this second detection mode in which the output signals are positive when the light reflected back/remitted back is in each case incident onto the second detection zone (that is corresponds to a signal from the background), it is moreover ensured—even with an object in the scanned zone which is so highly reflective that the remitted or diffusely reflected radiation would no longer be sufficient to carry out a reliable measurement—that reliable information is obtained whether the scanned zone is free or not.

The compensation of a center displacement of the light 36 or 38 respectively due to e.g. a high contrast object 20 or to an object having at least partly shiny regions or having such backgrounds therefore takes place in embodiments in accordance with the invention, in particular in the two described detection modes, reliably and independently of whether the center displacement has an equal effect on both position sensitive devices 44, 50. The method in accordance with the invention is thus particularly reliable and robust in particular also for the case of objects having at least partly shiny regions.

In the examples described, the reception optics 40, 42 are shown as separate lenses. The reception optics 40, 42 can, however, also be formed as a common arrangement, for example, a ring-shaped lens.

The examples were described with reference to the use of position sensitive devices (PSDs) which deliver a current signal which depends on the position of the light spot on the receiver. Other measuring device are also possible, for example photodiode arrays, which are split between the two detection zones or devices which only have two photo devices which form the two detection zones.

In the present text, the output signals 60, 62 are called "positive" ("negative") or "ON" ("OFF") when the center of the light 36/38 reflected back/remitted back is detected as incident onto the first (second) detection zone 46, 52 (48, 54).

These designations, however, only serve for a simple illustration. Other designations are equally possible (for example "1" if the first detection zone 46, 52 is illuminated and "2" if the second detection zone 48, 54 is illuminated).

The dividing line 16 between the foreground zone 12 and the background zone 14 can be fixed as follows within the framework of a teach-in process (configuration process). A known object having a non-critical surface is introduced into the scanned zone 12 and is moved in the direction of the dividing line 16. The evaluation units 56, 58 are configured such that they produce output signals 60, 62 from the measured signals 57, 59 which arise in this process, said output signals changing from one state to another state precisely when the non-critical known object is just located at the desired dividing line 16.

The configuration can in this respect take place, when position sensitive devices are used as receiver devices, by fixing a limit current signal which the position sensitive device outputs when light is just being reflected back or remitted back onto the receiver device by the distance of the dividing line 16. With photodiode arrays as receiver devices, it can be fixed in the configuration process which of the photodiodes of the respective array are associated with a first detection zone and which photodiodes of the respective photodiode array are associated with the second detection zone. If receiver devices are used which only comprise two photo devices which form the first and second detection zones respectively, the dividing line 16 is thus already fixed. Here, however, a displacement of the receiver device can be carried out which also inherently effects a displacement of the border between the first and the second detection zones and therefore also results in a displacement of the dividing line.

The invention is not restricted to the two detection modes which are listed here by way of example. Other detection modes and application scenarios are conceivable, for example if objects should be detected in the background while neglecting the foreground.

REFERENCE NUMERAL LIST 10 monitored zone
12 scanned zone
14 background zone
16 imaginary dividing line
20 object
30 light emitting diode
32 transmission light system axis
34 transmission optics
36, 38 light reflected back/remitted back
40, 42 reception optics
44 position sensitive device
46 first detection zone
48 second detection zone
50 position sensitive device
52 first detection zone
54 second detection zone
56 evaluation unit
57 measured signal
58 evaluation unit
59 measured signal
60, 62 output signal
64 logic unit
66 object determination signal
70 housing

The invention claimed is:

1. A method for the optical monitoring of a monitored zone (10), wherein
    light is transmitted by a transmission device (30) along a transmission light system axis (32) into the monitored zone (10);
    light (36) reflected back/remitted back from the monitored zone (10) is detected by a first light receiver (44) via a first reception light path, with the first light receiver (44) including at least two spatial detection zones (46, 48) which are arranged so that a first detection zone (46) receives light (36) reflected back/remitted back when a diffusely reflective object (20) is located in a scanned zone (12) of the monitored zone (10) and a second detection zone (48) receives light reflected back/remitted back when a diffusely reflective object is located in a background zone (14) of the monitored zone (10); and
    light (38) reflected back/remitted back from the monitored zone (10) is detected by a second light receiver (50) via a second reception light path, with the second light receiver (50) including at least two spatial detection zones (52, 54) which are arranged so that a first detection zone (52) receives light (38) reflected back/remitted back when a diffusely reflective object (20) is located in s scanned zone (12) of the monitored zone (10) and a second detection zone (54) receives light reflected back/remitted back when a diffusely reflected object is located in a background zone (14) of the monitored zone (10);
    wherein the reception light paths are located on different sides of the transmission light system axis (32),
    wherein
        a first output signal (60) of the first light receiver (44) is produced in dependence on whether the center of the light (36) reflected back/remitted back in the direction of the first light receiver (44) is located in the first detection zone (46) or in the second detection zone (48) of the light receiver (44), with the first output signal (60) only being able to adopt one of two possible states;
        a second output signal (62) of the second light receiver (50) is produced in dependence on whether the center of the light (38) reflected back/remitted back in the direction of the second light receiver (50) is located in the first detection zone (52) or in the second detection zone (54) of the light receiver (50), with the second output signal (62) only being able to adopt one of two possible states; and
        the first and the second output signals (60, 62) are logically linked with one another to produce an object determination signal (66).

2. A method for optical monitoring in accordance with claim 1, wherein a positive output signal (60, 62) of the light receiver (44, 50) is produced if the center of the flight reflected back/remitted back in the direction of the associated light receiver is incident onto the first detection zone (46, 52) of the associated light receiver.

3. A method for optical monitoring in accordance with claim 2, wherein
    the logical connective is an OR connective; and
    a positive object determination signal (66) is produced when at least one output signal (60, 62) is positive and a negative object determination signal (66) is produced when both output signals (60, 62) are negative.

4. A method for optical monitoring in accordance with claim 2, wherein
    the logical connective is an AND connective; and
    a positive object determination signal (66) is produced when both output signals (60, 62) are positive and a negative object determination signal (66) is produced when at least one output signal (60, 62) is negative.

5. A method for optical monitoring in accordance with claim 2, wherein the logical connective is a FLIP-FLOP connective; and
a positive object determination signal (66) is produced as soon as both output signals are positive at one time and a negative object determination signal is produced as soon as both output signals are negative at one time.

6. A method for optical monitoring in accordance with claim 1, wherein a positive output signal (60, 62) of the light receiver (44, 50) is produced when the center of the light reflected back/remitted back in the direction of the associated light receiver is incident onto the second detection zone (48, 54) of the associated light receiver.

7. A method for optical monitoring in accordance with claim 6, wherein the logical connective is an OR connective; and
a positive object determination signal (66) is produced when at least one output signal (60, 62) is negative and a negative object determination signal (66) is produced when both output signals (60, 62) are positive.

8. A method for optical monitoring in accordance with claim 6, wherein the logical connective is an AND connective; and
a positive object determination signal (66) is produced when both output signals (60, 62) are negative and a negative object determination signal (66) is produced when at least one output signal (60, 62) is positive.

9. A method for optical monitoring in accordance with claim 6, wherein the logical connective is a FLIP-FLOP connective; and
a positive object determination signal (66) is produced as soon as both output signals are negative at one time and a positive object determination signal is produced as soon as both output signals are positive at one time.

10. A method in accordance with claim 1, wherein a dividing line (16) between the scanned zone (12) and a background zone (14) is set by an electronic teach-in process.

11. A method in accordance with claim 10, wherein a diffusely reflective/remitting object is brought into a spacing of the desired dividing line (16) to carry out the teach-in process and the detection zones (46, 48) of the first light receiver (44) and the detection zones (52, 54) of the second light receiver (50) are set so that the light reflected back/remitted back by the object via the reception light paths in the spacing of the desired dividing line (16) is incident onto the respective border between the first and the second detection zones.

12. A light sensor comprising at least one light transmitter (30) for transmitting a light signal along a transmission light system axis (32) into a monitored zone (10);
at least one first light receiver (44) for receiving light (36) reflected back/remitted back out of the monitored zone (10) via a first reception light path, with the first light receiver (44) including at least two spatial detection zones (46, 48) which are arranged so that a first detection zone (46) receives light reflected back/remitted back when a diffusely reflective object (20) is located in a scanned zone (12) of the monitored zone (10) and a second detection zone (48) receives light reflected back/remitted back when a diffusely reflective object is located in a background zone (14) of the monitored zone,
at least one second light receiver (50) for receiving light (38) reflected back/remitted back out of the monitored zone (12) via a second reception light path, with the second light receiver (50) including at least two spatial detection zones (52, 54) which are arranged so that a first detection zone (52) receives light reflected back/remitted back when a diffusely reflective object (20) is located in a scanned zone (12) of the monitored zone (10) and a second detection zone (54) receives light reflected back/remitted back when a diffusely reflective object is located in a background zone (14) of the monitored zone,
wherein the reception light paths are located at different sides of the transmission light system axis (32), wherein a first evaluation device (56) for forming a first output signal (60) from the measured signal (57) of the first light receiver (44), with the first output signal (60) only being able to adopt one of two possible states;
a second evaluation device (58) for forming a second output signal (62) from the measured signal (59) of the second light receiver (50), with the second output signal (62) only being able to adopt one of two possible states;
a logic unit (64) which logically links the first and second output signals (60, 62) to one another for producing an object determination signal (66).

13. A light sensor in accordance with claim 12, wherein a signal forming unit which includes the first and the second evaluation devices, preferably also the logic unit.

14. A light sensor in accordance with claim 12, wherein the reception light paths are arranged symmetrical to the transmission light system axis (32); and/or include reception optics (40, 42).

15. A light sensor in accordance with claim 12, wherein the logic unit (64) is designed so that it carries out a logic linking for performing a method for optical monitoring, wherein a positive output signal (60, 62) of the light receiver (44, 50) is produced if the center of the flight reflected back/remitted back in the direction of the associated light receiver is incident onto the first detection zone (46, 52) of the associated light receiver.

* * * * *